(12) United States Patent
Kooter Lenders

(10) Patent No.: US 7,243,950 B2
(45) Date of Patent: Jul. 17, 2007

(54) ADJUSTABLE SEAT BELT GUIDE

(75) Inventor: Veronique Therese Josephine Marguerite Kooter Lenders, Zoetermeer (NL)

(73) Assignee: Solid Jacqed I BV, Heilig Landstichting, Chamber of Commerce (NL)

( * ) Notice: Subject to any disclaimer, the term of this patent is extended or adjusted under 35 U.S.C. 154(b) by 157 days.

(21) Appl. No.: 10/502,329

(22) PCT Filed: Aug. 13, 2002

(86) PCT No.: PCT/NL02/00542

§ 371 (c)(1),
(2), (4) Date: Apr. 19, 2005

(87) PCT Pub. No.: WO03/106230

PCT Pub. Date: Dec. 24, 2003

(65) Prior Publication Data

US 2005/0230953 A1   Oct. 20, 2005

(51) Int. Cl.
*B60R 22/00* (2006.01)
(52) U.S. Cl. .................. 280/808; 297/468; 297/483
(58) Field of Classification Search ........... 280/801.1, 280/808, 802; 297/468, 482, 483, 486, 487, 297/488
See application file for complete search history.

(56) References Cited

U.S. PATENT DOCUMENTS

| 4,289,352 A | 9/1981 | Ashworth | 297/473 |
| 4,324,204 A | 4/1982 | Friedman | 119/96 |
| 6,142,575 A | 11/2000 | Patterson | 297/482 |

FOREIGN PATENT DOCUMENTS

| DE | 94 18 273.6 U1 | | 2/1995 |
| EP | 0 952 047 A1 | | 10/1999 |
| EP | 1 092 410 A2 | | 4/2001 |
| EP | 1 092 410 A3 | | 8/2002 |
| FR | 2533446 | * | 3/1984 |
| FR | 2 685 670 A1 | | 7/1993 |
| GB | 2 208 468 A | | 4/1989 |
| SE | 9003883-7 | * | 12/1990 |
| WO | WO92/10385 | * | 6/1992 |

* cited by examiner

*Primary Examiner*—Eric Culbreth
(74) *Attorney, Agent, or Firm*—Sierra Patent Group, Ltd.

(57) ABSTRACT

The present invention relates to an adjustable seat belt guide (15) which is constructed of a clamping belt (5) around the back support (6) of a car seat (4) in a vertical way and supplied with a tightening retaining clip (7) for a taut fastening, in which through a cover (8) around the clamping belt (5) a rectangular carabiner or other inventable locking mechanism (10) provided with a lockable opening, preferably a turnable bush (11) is attached, in which the car seat belt (1) is applied through the locking mechanism (10) so that a very comfortable complete car seat belt assembly is created for a pleasant ride.

8 Claims, 3 Drawing Sheets

ADJUSTABLE SEAT BELT GUIDE

This application claims first priority to the Netherlands Patent Application No. 102 0859 filed on Jun. 14, 2002, and the United States was timely specified as an Elected Country in the PCT Patent Application No. PCT/NL02/00542 filed on Aug. 13, 2002, which is explicitly incorporated by reference as if set forth below.

The present invention relates to a device for adjusting the upper point of grip of seat belts, a so called adjustable seat belt guide, in which the mentioned upper point of grip should be lowerable in most cases to be adjusted to the length of the user, which in that case are mostly "young" people with a body length between 1 m and 1.65 m.

A somewhat similar adjustable seat belt guide is not known in the looked up patent literature, but there is known a general in height adjustable seat belt, not being a seat belt guide. It concerns the European patent document number WO 9210385, based on the Swedish patent document number SE 199 00003883 19901206 of VOLVO AB (SE) with inventor PILHALL STIG (SE).

Here it concerns a seat belt guide, which is mounted adjustably on the top side on the inside of the vehicle, such as a private car, and as mentioned especially meant for persons on the back seat. The seat belt is of the retractable reel-like type and is mounted on the inner side of the compartment of the vehicle. The in height adjustable assembly consists of an in longitudinal direction sticking out body. The in longitudinal direction sticking out body is mounted on the inner side of the compartment at shoulder height of the person. The length of the guiding body of in longitudinal direction sticking out body has an upper attachment point of the safety belt that can be fixed slidably such that with smaller 'adult' people the transverse belt does not touch the face.

The aforementioned known device has a number of disadvantages. The greatest disadvantage is that only the upper attachment point of the safety belt, the transverse belt, or cross belt is adjustable. In all these invented constructions, the belt does not lay low enough over just the chest of smaller persons. Furthermore, these designs prevent the height of the attachment of the belt from being adjusted below the upper side of the back support of the car seat. Letting the safety belt run over the car seat with friction would not be a solution for a comfortable safety belt and especially the transverse belt or cross belt either so that, the known adjustment device certainly does not offer a comfortable solution.

Another similar solution, as described above, is described in the French patent document FR 2533446 of applicant RENAULT (FR) with inventor JOURDAN, Jacques and LARSONNEUR, Jean-Francois.

This reference describes a safety belt with retracting assembly and device for adjusting the height of the transverse belt or cross belt, in which the upper side can be fixed adjustably to a vertical guide on the inner side of the vehicle. The upper side of the transverse belt can be adjusted to a certain extent. For smaller persons and especially young people, these described adjustment possibilities are not nearly enough and the aforementioned disadvantages of un-safety and little comfort during the ride are still maintained.

The aim of the present invention concerns to provide such a solution for adjusting in height of the transverse belt or cross belt, that the aforementioned disadvantages are eliminated and of which the use is better and by which an adjustable seat belt guide can be delivered which is suitable for wide use at a reasonable price.

For this a device for adjusting the upper point of grip of seat belts and specifically a height lower than the upper side of the back support is further developed in a very inventive way, that the mentioned device, the so called adjustable seat belt guide, is constructed of a vertical, around the side of the back support of the car seat attachable or mountable clamping belt or belt with tightening retaining clip for a taut fastening, in which around the mentioned clamping belt a movable cover is applied with at least one rectangular opening faced away from the back support and transverse on the direction of the clamping belt for leading through a rectangular carabiner applied around the clamping belt and which also goes through the mentioned rectangular opening, in which the actual supporting seat belt is fixed through the rectangular space of the carabiner, in which the mentioned carabiner is lockable or retainable on the outside, in which the material of the mentioned clamping belt can be a woven fabric and the material of the locking mechanism can be a metal or plastic or any other material with sufficient strength quality.

The advantage is that a guiding adjustment possibility is created for almost every body length, which strongly improves the comfort and safety for, for example children and makes the journey much more pleasant.

Further the device according to the invention is developed in such a way, that the mentioned clamping belt of the adjustable seat belt guide is of woven seat belt fabric, and that the mentioned tightening retaining clip is an in the market available lashing buckle or another design of a clip or clasp.

The advantage is that the adjustable seat belt guide can be applied fast and effectively (without sliding while in use) around the back support of the car seat.

Furthermore the device according to the invention is developed in such a way that, the mentioned cover can be made of a woven fabric, leather, plastic or any material with flexible properties, in which at least one central rectangular opening is applied for the carabiner or other locking mechanism and further, if required, above and below the mentioned rectangular opening two parallel rectangular slits for lead-through of the clamping belt are applied.

The advantage is an in unloaded position slidable cover over the belt of the adjustable seat belt guide and after attaching the locking mechanism (at this moment the carabiner) stays well at the desired height.

Furthermore the device according to the invention is further developed in such a way, that the mentioned carabiner has an opening faced outwardly, which can be closed by a turnable over the carabiner with the turnable having an elongated bush with roughened outer surface or that the mentioned carabiner has an opening faced outwardly, which can be closed by a spring snap construction or lip construction or other locking mechanism.

The advantages are that the transverse belt of the seat belt can be attached or mounted in a suitable and very handy way through the locking mechanism of mentioned carabiner of the adjustable seat belt guide.

The preferred construction of the invention will be described by way of example, and with reference to the accompanying drawing, in which:

FIG. 1 shows a front view in oblique projection of the usual and mostly only way of positioning or application of the known safety belt 1 on a young lady or child 2 with a relatively small body length.

The child or the young lady 2 is seated on the back seat 4 of a car and therefore gets the cross belt of the safety belt 1 against her face 3, which is very annoying and because of which the trip becomes unpleasant.

Figure 2:
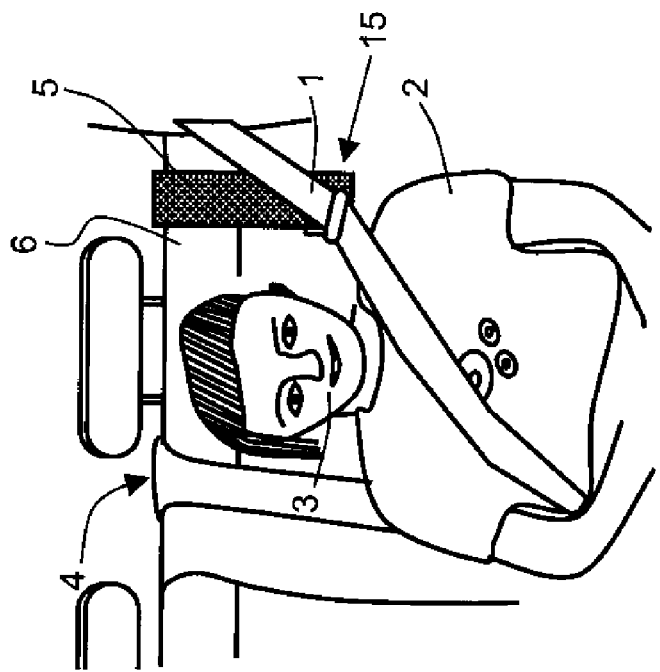
FIG. 2 shows a front view in oblique projection of the utilization of the adjustable seat belt guide according to a preferred embodiment of the invention on the young lady of FIG. 1.
Figure 1:
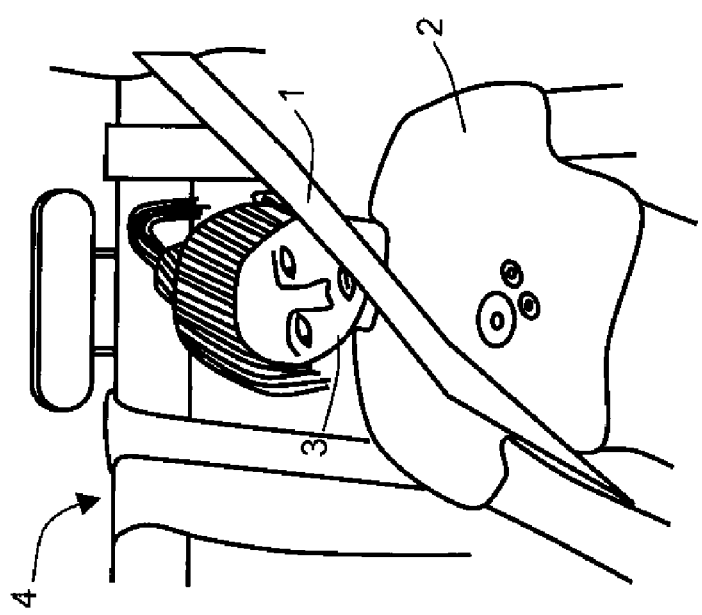
FIG. 1 shows a front view in oblique projection of the usual position of a safety belt on a young lady with a small body length and constructed according to the known art.
Figure 3:
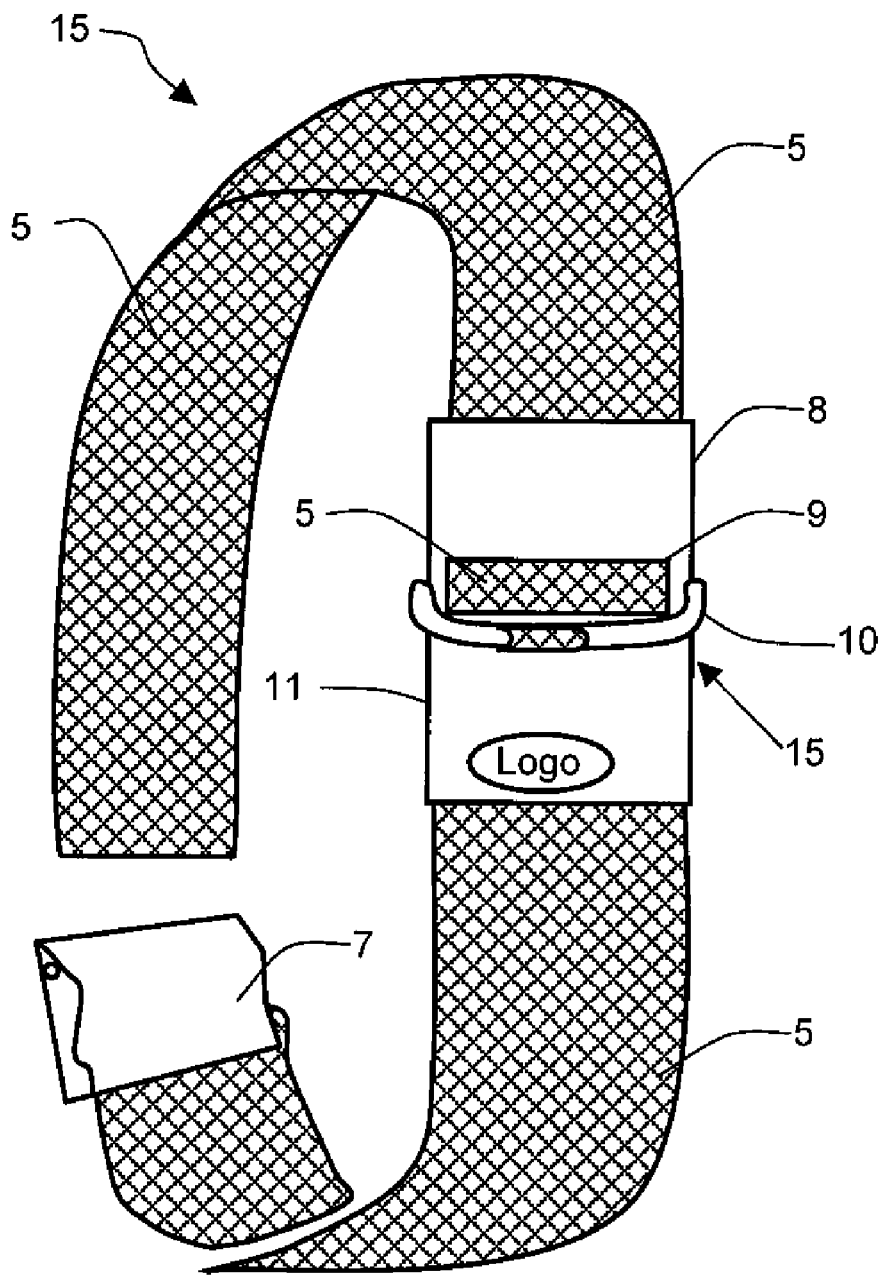
FIG. 3 shows a front view in oblique projection of the adjustable seat belt guide according to a first preferred embodiment of the invention.
Figure 4:
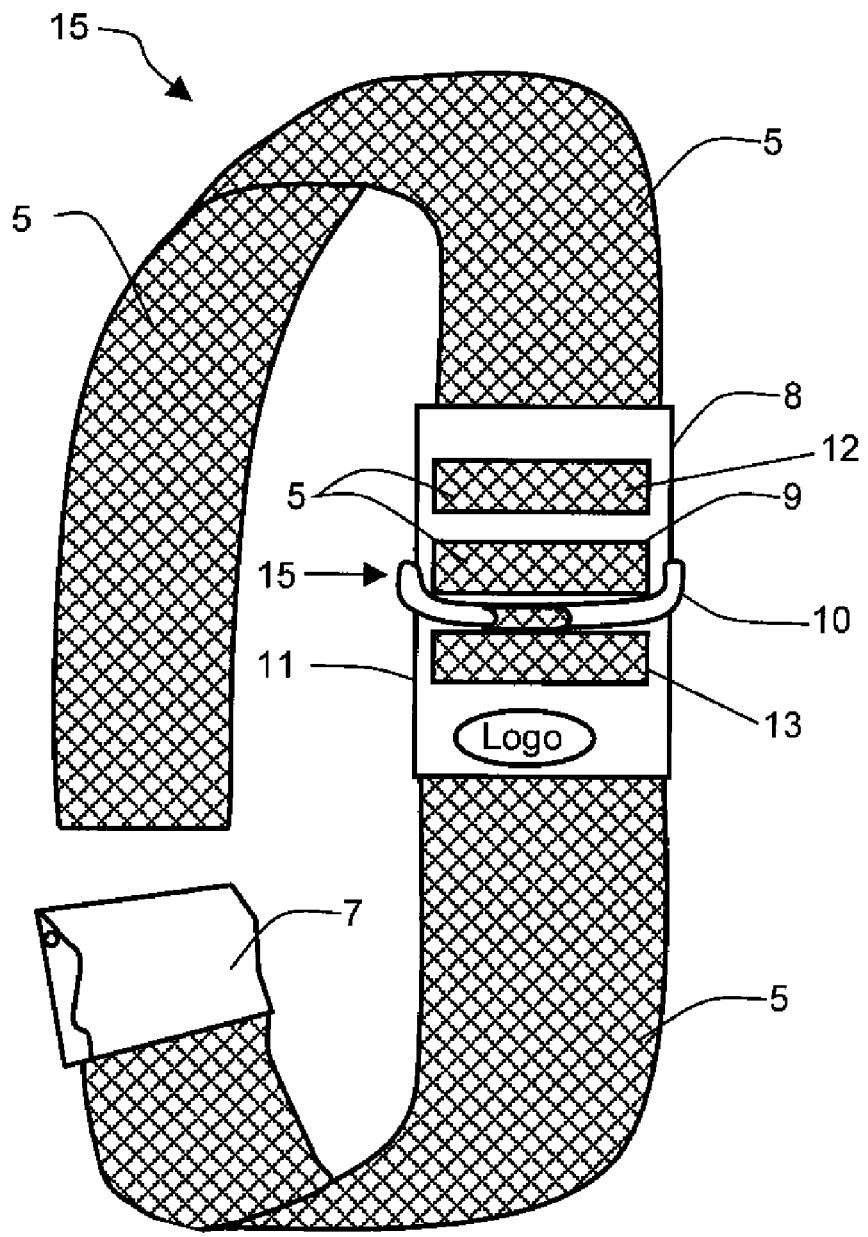
FIG. 4 shows a front view in oblique projection of the adjustable seat belt guide according to a second preferred embodiment of the invention.

FIG. 2 shows a front view in oblique projection of the utilization of the adjustable seat belt guide 15 with clamping belt 5 for the cross belt of the safety belt 1. This way the child or the young lady 2 experiences the car trip as much more pleasant. The adjustable seat belt guide with clamping belt 5 is strapped around the back support 6 of the back seat 4 in a vertical way. Strapping is done with a tightening retaining clip 7, as shown in FIGS. 3 and 4. The adjustable seat belt guide 15 with clamping belt 5 further consists of an along the seat belt guide movable or slidable cover 8 with, faced away from the adjustable seat belt guide 15 with clamping belt 5, at least one rectangular opening 9 transverse on the direction of the adjustable seat belt guide 15 with clamping belt 5, through which the adjustable seat belt guide 15 with clamping belt 5 becomes visible again from the outside. Through the mentioned opening 9, a carabiner 10 is fixed around the actual clamping belt 5 of the adjustable seat belt guide 15 by means of, for example screwing the turnable bush lock 11 open. By opening the carabiner 10 again, the cross belt of the safety belt 1 is applied or mounted, after which the opened carabiner is closed again and the adjustable seat belt guide is fastened. This turnable bush lock 11 can also be replaced by a springy snap construction (i.e., a springy over a hook) or lip construction as well as a round wire through a bore (shown schematically in FIG. 4). The locking mechanism is one of stainless steel and material with strength quality and plastic, possibly polypropylene.

FIG. 4 also shows two parallel rectangular slits 12 and 13 above and below the central rectangular opening 9. This can have as purpose that the cover 8 is slidable along the adjustable belt with a larger friction. Furthermore logo's, advertisement messages, marks and further texts can be applied on the cover 8 and/or the lock 11, through which the whole looks even more aesthetic or desirable and possibly leads to even better sale results.

Finally it has to be emphasized, that the above description constitutes a preferred embodiment of the present invention and that further variations and modifications are still possible without departing the scope of this patent description.

The invention claimed is:

1. A device for adjusting an upper point of grip of seat belts, comprising an adjustable seat belt guide, in which mentioned upper point of grip should be lowerable in most cases to be adjusted to the length of the a user, which in that case is mostly young people with a body length between 1 m and 1.65 m, characterized in that, the adjustable seat belt guide comprises:

a vertical, around the side of a back support of a car seat at least one of attachable and mountable clamping belt or belt with tightening retaining clip for a taut fastening, in which around said clamping belt a movable cover is applied with at least one rectangular opening faced away from the back support and transverse on the direction of the clamping belt for leading through of a rectangular carabiner applied around the clamping belt and which also goes through said rectangular opening, in which an actual supporting seat belt is fixed through the carabiner, in which the mentioned carabiner is lockable or retainable on the outside, in which the material of the mentioned clamping belt is a woven fabric and the material of a locking mechanism of the carabiner is of a rigid material.

2. The device as claimed in claim 1, wherein said clamping belt of the adjustable seat belt guide is of woven seat belt fabric, and that said tightening retaining clip is a lashing buckle.

3. The device as claimed in claim 1, wherein said cover is made of one of a woven fabric, leather, plastic and material with flexible properties, in which above and below said rectangular opening two parallel rectangular slits for a lead-through of the clamping belt are applied.

4. The device as claimed in claim 1 wherein said carabiner has an opening faced outwardly, which is closed by a turnable over the carabiner, the turnable comprising an elongated bush with a roughened outer surface.

5. The device as claimed in claim 4 wherein said outer surface of the turnable and the cover with the carabiner is provided with at least one of advertisement messages, marks, logo's, texts to provide a more attractive look.

6. The device as claimed in claim 1 wherein said carabiner has an opening faced outwardly, which can be closed by one of a spring snap construction and a lip construction.

7. The device as claimed in claim 1 wherein said carabiner has an opening faced outwardly, which can be closed by a round wire mounted through a bore and springy over a hook.

8. The device as claimed in claim 1 wherein said carabiner is one of a stainless steel and rigid material and said plastic is polypropylene.

* * * * *